US010381895B2

(12) United States Patent
Roberts

(10) Patent No.: US 10,381,895 B2
(45) Date of Patent: Aug. 13, 2019

(54) BEARING ARRANGEMENT FOR AN ELECTRIC MOTOR OR GENERATOR

(71) Applicant: PROTEAN ELECTRIC LIMITED, Surrey (GB)

(72) Inventor: Gareth Roberts, South Heighton (GB)

(73) Assignee: PROTEAN ELECTRIC LIMITED, Surrey (GB)

( * ) Notice: Subject to any disclaimer, the term of this patent is extended or adjusted under 35 U.S.C. 154(b) by 182 days.

(21) Appl. No.: 15/548,455

(22) PCT Filed: Feb. 3, 2016

(86) PCT No.: PCT/IB2016/050549
§ 371 (c)(1),
(2) Date: Aug. 3, 2017

(87) PCT Pub. No.: WO2016/125092
PCT Pub. Date: Aug. 11, 2016

(65) Prior Publication Data
US 2018/0019636 A1  Jan. 18, 2018

(30) Foreign Application Priority Data
Feb. 4, 2015  (GB) .................................. 1501815.3

(51) Int. Cl.
*H02K 5/10*  (2006.01)
*B60K 7/00*  (2006.01)
(Continued)

(52) U.S. Cl.
CPC ........... *H02K 5/10* (2013.01); *B60B 27/0015* (2013.01); *B60B 27/0073* (2013.01);
(Continued)

(58) Field of Classification Search
CPC .. H02K 5/10; H02K 5/15; H02K 5/16; H02K 5/173; H02K 7/085; H02K 7/14;
(Continued)

(56) References Cited

U.S. PATENT DOCUMENTS

| 5,880,543 A | 3/1999 | Park | |
| 7,898,134 B1 * | 3/2011 | Shaw | H02K 1/148 |
| | | | 310/112 |

(Continued)

FOREIGN PATENT DOCUMENTS

| CA | 2621599 A1 | 8/2009 |
| GB | 2185154 A | 7/1987 |

(Continued)

OTHER PUBLICATIONS

European Patent Office, International Search Report, dated May 2, 2016, World Intellectual Property Organization, Rijswijk.

(Continued)

*Primary Examiner* — Bernard Rojas
*Assistant Examiner* — Rashad H Johnson
(74) *Attorney, Agent, or Firm* — Nolte Intellectual Property Law Group

(57) ABSTRACT

A bearing arrangement for mounting a wheel and an electric motor or generator having a stator and a rotor to a vehicle, the bearing arrangement comprising a sealing element and a bearing block, wherein the bearing block includes a first coupling element for coupling to a first radial wall of the rotor and the wheel, and a second coupling element for coupling to the stator and/or the vehicle, with a first bearing mounted between the first coupling element and the second coupling element to allow the first coupling element and the second coupling element to rotate relative to each other, wherein the first coupling element includes a mounting flange having a bolt hole arranged to extend through the (Continued)

mounting flange for receiving a bolt at a first aperture of the bolt hole for coupling the rotor and the wheel to the first coupling element, wherein the sealing element is arranged to be mounted over a second aperture of the bolt hole for inhibiting the ingress of dirt through the bolt hole.

7 Claims, 13 Drawing Sheets

(51) Int. Cl.

| | | |
|---|---|---|
| *H02K 7/08* | (2006.01) | |
| *H02K 7/14* | (2006.01) | |
| *B60B 27/00* | (2006.01) | |
| *B60B 27/04* | (2006.01) | |
| *H02K 5/15* | (2006.01) | |
| *H02K 5/16* | (2006.01) | |
| *H02K 5/173* | (2006.01) | |

(52) U.S. Cl.
CPC ............ *B60B 27/04* (2013.01); *B60K 7/0007* (2013.01); *H02K 7/085* (2013.01); *H02K 7/14* (2013.01); *B60B 27/0005* (2013.01); *B60K 2007/0038* (2013.01); *B60K 2007/0092* (2013.01); *B60Y 2304/00* (2013.01); *H02K 5/15* (2013.01); *H02K 5/16* (2013.01); *H02K 5/173* (2013.01)

(58) Field of Classification Search
CPC ............ B60B 27/0005; B60B 27/0015; B60B 27/0073; B60B 27/04; B60B 2007/0038; B60B 2007/0092; B60Y 2304/00
USPC ..................................................... 310/89, 90
See application file for complete search history.

(56) References Cited

U.S. PATENT DOCUMENTS

| | | | | |
|---|---|---|---|---|
| 8,749,192 B2* | 6/2014 | Li | ............................ | H02K 3/28 |
| | | | | 318/799 |
| 8,955,626 B2* | 2/2015 | Trueman | .................. | B60K 6/48 |
| | | | | 180/65.25 |
| 9,150,202 B2* | 10/2015 | Kirby | .................... | B60K 7/0007 |
| 9,813,007 B2* | 11/2017 | Burke | ...................... | H02P 25/22 |
| 2012/0132473 A1* | 5/2012 | Weber | .................. | B60K 7/0007 |
| | | | | 180/58 |
| 2013/0069462 A1* | 3/2013 | Calvert | ................ | B60K 7/0007 |
| | | | | 310/88 |
| 2013/0218436 A1* | 8/2013 | Kirby | .................... | B60K 7/0007 |
| | | | | 701/74 |
| 2014/0191624 A1* | 7/2014 | Jahshan | .................. | H02K 35/02 |
| | | | | 310/68 B |
| 2015/0130315 A1* | 5/2015 | Wallace | .................. | H02K 7/083 |
| | | | | 310/91 |
| 2015/0185288 A1* | 7/2015 | Burke | .................. | G01R 31/343 |
| | | | | 318/490 |
| 2016/0226346 A1* | 8/2016 | Roberts | ..................... | H02K 7/14 |
| 2016/0276884 A1* | 9/2016 | Roberts | .................. | H02K 7/088 |
| 2016/0344246 A1* | 11/2016 | Fraser | ...................... | B60L 50/51 |
| 2017/0001513 A1* | 1/2017 | Kuroda | ................... | B60K 17/14 |
| 2017/0237315 A1* | 8/2017 | Hirokawa | .............. | H02K 7/003 |
| | | | | 310/77 |
| 2017/0324307 A1* | 11/2017 | Roberts | .................. | H02K 5/225 |
| 2018/0019636 A1* | 1/2018 | Roberts | ................ | B60K 7/0007 |
| 2018/0076699 A1* | 3/2018 | Kuhn | ........................ | H02K 5/16 |
| 2018/0361789 A1* | 12/2018 | Gunji | .................. | B60B 27/0005 |
| 2019/0020230 A1* | 1/2019 | Roberts | .................. | H02K 15/03 |

FOREIGN PATENT DOCUMENTS

| | | |
|---|---|---|
| GB | 2469562 A | 10/2010 |
| GB | 2484938 A | 5/2012 |
| JP | H04161045 A | 6/1992 |

OTHER PUBLICATIONS

European Patent Office, Written Opinion of the International Search Authority, dated Aug. 11, 2016, World Intellectual Property Organization, Rijswijk.

Intellectual Property Office, Exam Report and Search Report, dated Feb. 20, 2015, IPO, South Wales.

Intellectual Property Office, Search Report First, dated Feb. 19, 2015, IPO, South Wales.

* cited by examiner

BEARING ARRANGEMENT FOR AN ELECTRIC MOTOR OR GENERATOR

The present invention relates to a bearing arrangement for an electric motor or generator.

With increased interest being placed in environmentally friendly vehicles there has been a corresponding increase in interest in the use of electric motors for providing drive torque for electric vehicles.

Electric motors work on the principle that a current carrying wire will experience a force when in the presence of a magnetic field. When the current carrying wire is placed perpendicular to the magnetic field the force on the current carrying wire is proportional to the flux density of the magnetic field. Typically, in an electric motor the force on a current carrying wire is formed as a rotational torque.

Examples of known types of electric motor include the induction motor, brushless permanent magnet motor, switched reluctance motor and synchronous slip ring motor, which have a rotor and a stator, as is well known to a person skilled in the art.

In the commercial arena three phase electric motors are the most common kind of electric motor available.

A three phase electric motor typically includes three coil sets, where each coil set is arranged to generate a magnetic field associated with one of the three phases of an alternating voltage.

To increase the number of magnetic poles formed within an electric motor, each coil set will typically have a number of coil sub-sets that are distributed around the periphery of the electric motor, which are driven to produce a rotating magnetic field.

The three coil sets of a three phase electric motor are typically configured in either a delta or wye configuration.

A control unit for a three phase electric motor having a DC power supply will typically include a three phase bridge inverter that generates a three phase voltage supply for driving the electric motor. Each of the respective voltage phases is applied to a respective coil set of the electric motor.

Typically, the three phase bridge inverter will generate a three phase voltage supply using a form of pulse width modulation (PWM) voltage control. PWM control works by using the motor inductance to average out an applied pulse voltage to drive the required current into the motor coils. Using PWM control an applied voltage is switched across the motor coils. During this on period, the current rises in the motor coils at a rate dictated by its inductance and the applied voltage. The PWM control is then required to switch off before the current has changed too much so that precise control of the current is achieved.

A three phase bridge inverter includes a number of switching devices, for example power electronic switches such as Insulated Gate Bipolar Transistor (IGBT) switches.

In the context of an electric vehicle motor, a drive design that is becoming increasing popular is an integrated in-wheel electric motor design in which an electric motor and its associated control system are integrated within a wheel of a vehicle.

However, due to the environmental conditions that a wheel of a vehicle may have to operate in, the integration of an electric motor, and its associated control system, within a wheel of a vehicle can impose increased environmental requirements upon the electric motor and associated control system.

In particular, when mounting a wheel to an in-wheel electric motor using bolts, which is the conventional mechanism for attaching a wheel to a vehicle, this can allow the bolt holes formed in the electric motor to act as an ingress path for dirt, water and other contaminates. One solution to minimise the ingress of contaminates would be to use blind bolt holes, however the use of blind bolt holes can have adverse space and packaging implications compared to through holes.

It is desirable to improve this situation.

In accordance with an aspect of the present invention there is provided a bearing arrangement for an electric motor or generator according to the accompanying claims.

The invention as claimed provides the advantage of minimising the ingress of dirt and/or water and/or other contaminants into an in-wheel electric motor with a minimum impact on the space envelope requirements for an electric motor or generator.

The present invention will now be described, by way of example, with reference to the accompanying drawings, in which.

Figure 1:
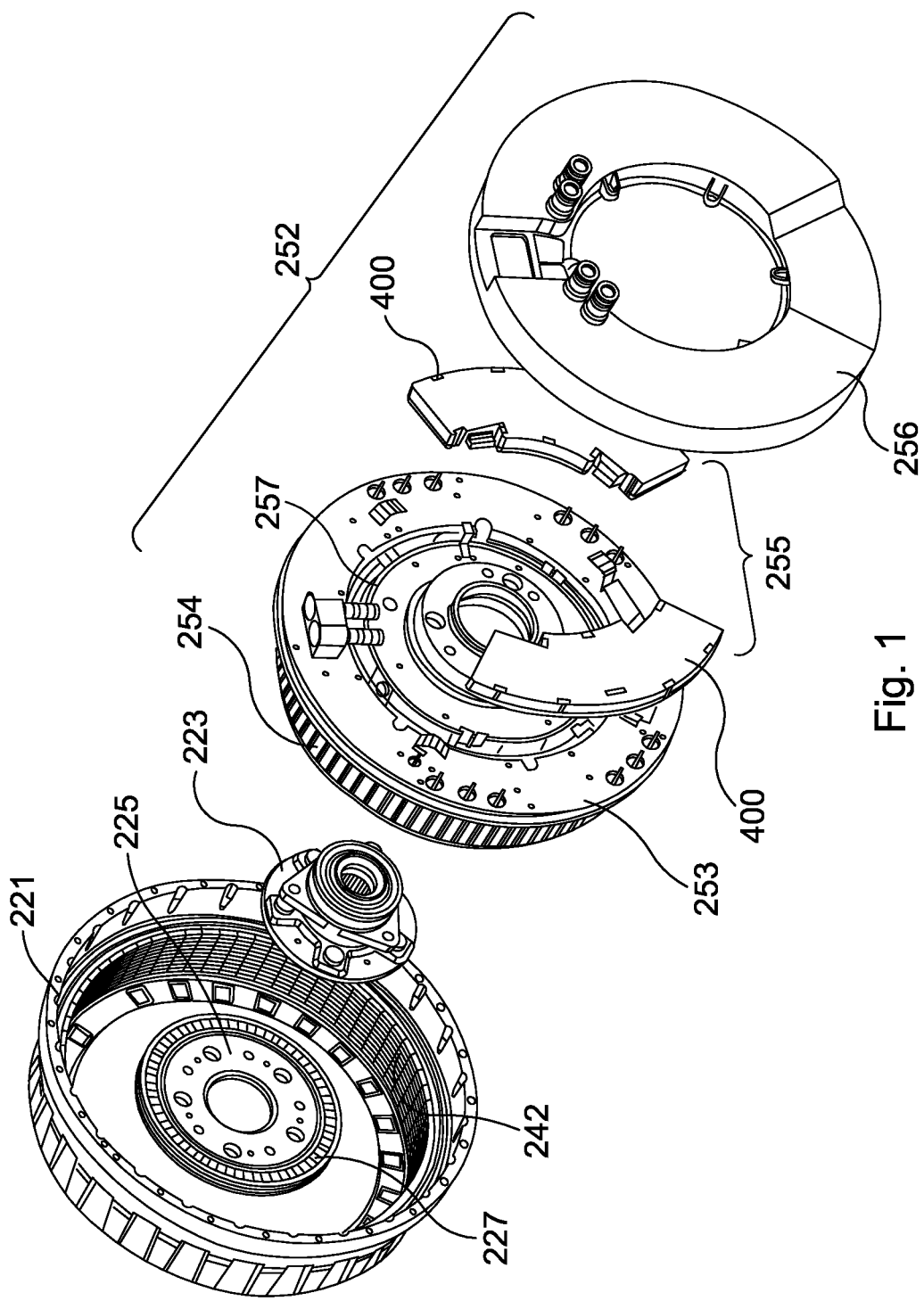
FIG. 1 illustrates an exploded view of a motor according to an embodiment of the present invention.
Figure 2:
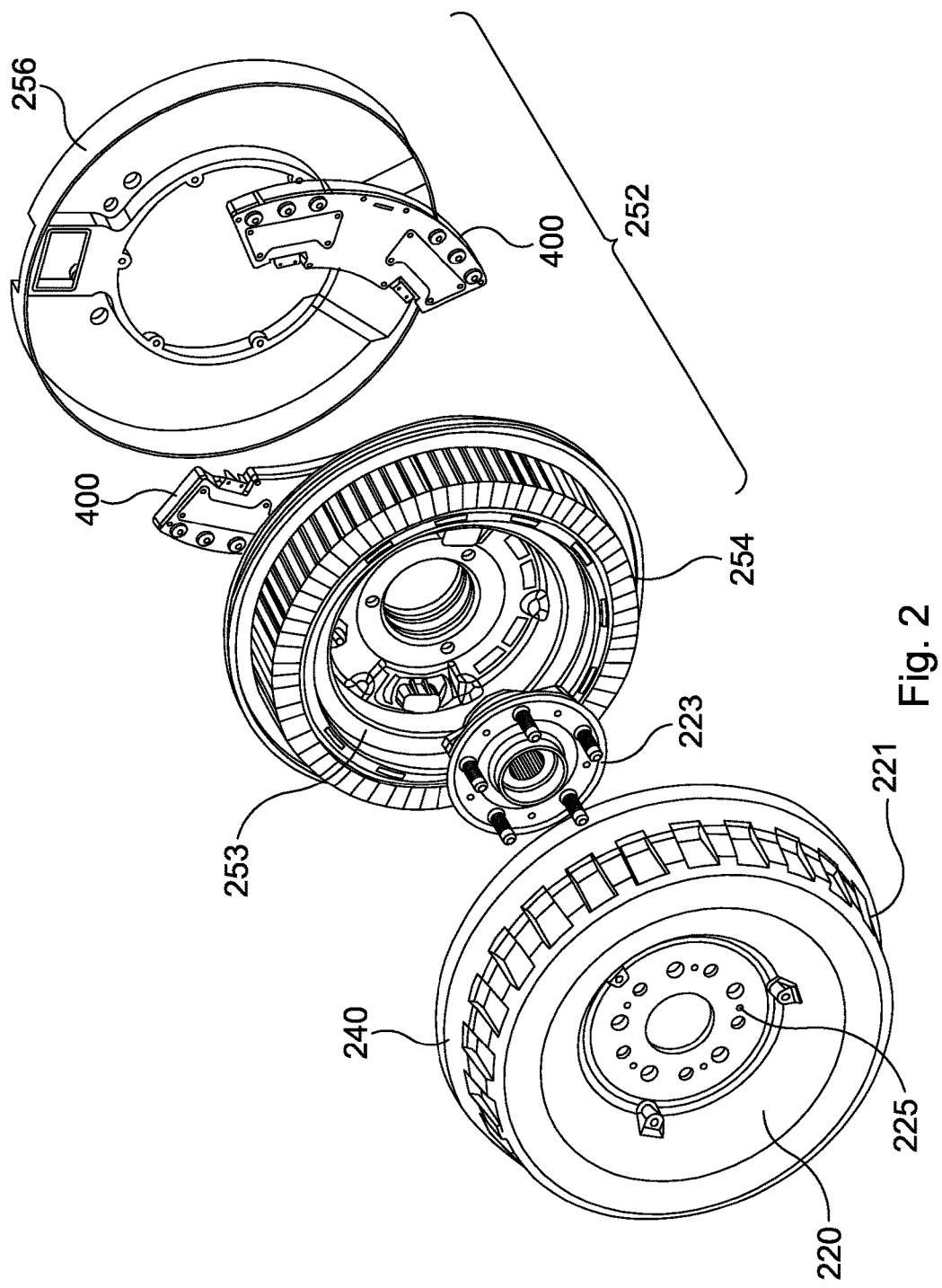
FIG. 2 illustrates an exploded view of the motor of FIG. 1 from an alternative angle.

FIG. 1 and FIG. 2 illustrate an electric motor assembly incorporating an electric motor having a bearing arrangement according to the present invention, where the electric motor assembly includes built in electronics and is configured for use as a hub motor or in-wheel electric motor built to be accommodated within a wheel of a vehicle. However, the present invention can be incorporated in any form of electric motor. The electric motor can also be configured as a generator.

FIG. 2 shows an exploded view of the same assembly as FIG. 1 from the opposite side.

For the purposes of the present embodiment, as illustrated in FIG. 1 and FIG. 2, preferably the in-wheel electric motor includes a stator assembly 252 and a rotor assembly 240. The stator assembly 252 comprising a heat sink 253 having a cooling channel, multiple coils 254, an electronics module 255 mounted in a rear portion of the stator for driving the coils, and a capacitor (not shown) mounted on the stator within a recess 257 formed on the rear portion of the stator. In a preferred embodiment the capacitor is an annular capacitor element.

The coils 254 are formed on stator tooth laminations to form coil windings. A stator cover 256 is mounted on the rear portion of the stator 252, enclosing the electronics module 255 to form the stator assembly 252, which may then be fixed to a vehicle and does not rotate relative to the vehicle during use.

The electronics module 255 includes two control devices 400, where each control device 400 includes an inverter and control logic, which in the present embodiment includes a processor, for controlling the operation of the inverter. However, the electronics module 255 can include any number of control devices.

To reduce the effects of inductance on the inverters, when switching current, the capacitor mounted on the stator is used as a local voltage source for the electric motor inverters. By placing a capacitor close to an inverter the inductance associated with the voltage source is minimised.

A rotor 240 comprises a front portion 220 and a cylindrical portion 221 forming a cover, which substantially surrounds the stator assembly 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor assembly 240 to cause the rotor assembly 240 to rotate. As the permanent magnets 242 are utilized to generate a drive torque for driving the electric motor, the permanent magnets are typically called drive magnets.

The rotor 240 is attached to the stator 252 via a bearing arrangement that includes a bearing block 223 and a sealing element (not shown). The bearing block 223 can be a standard bearing block as would be used in a vehicle to which this motor assembly is to be fitted.

Figure 3:
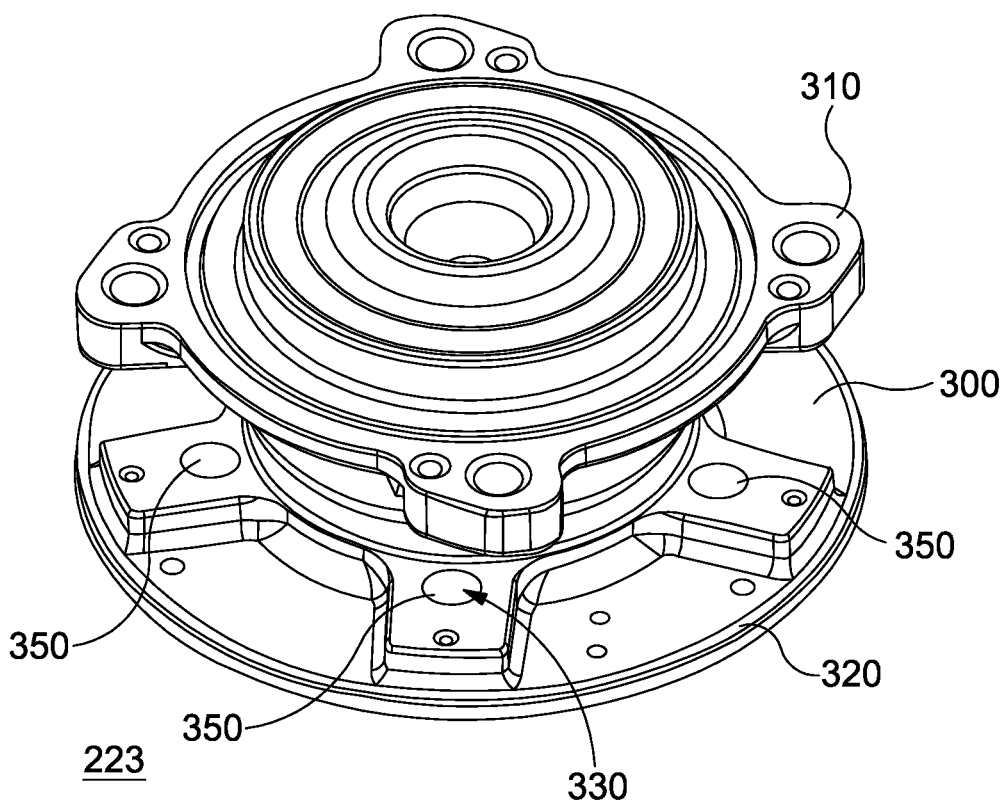
FIG. 3 illustrates a bearing block according to an embodiment of the present invention.
Figure 4:
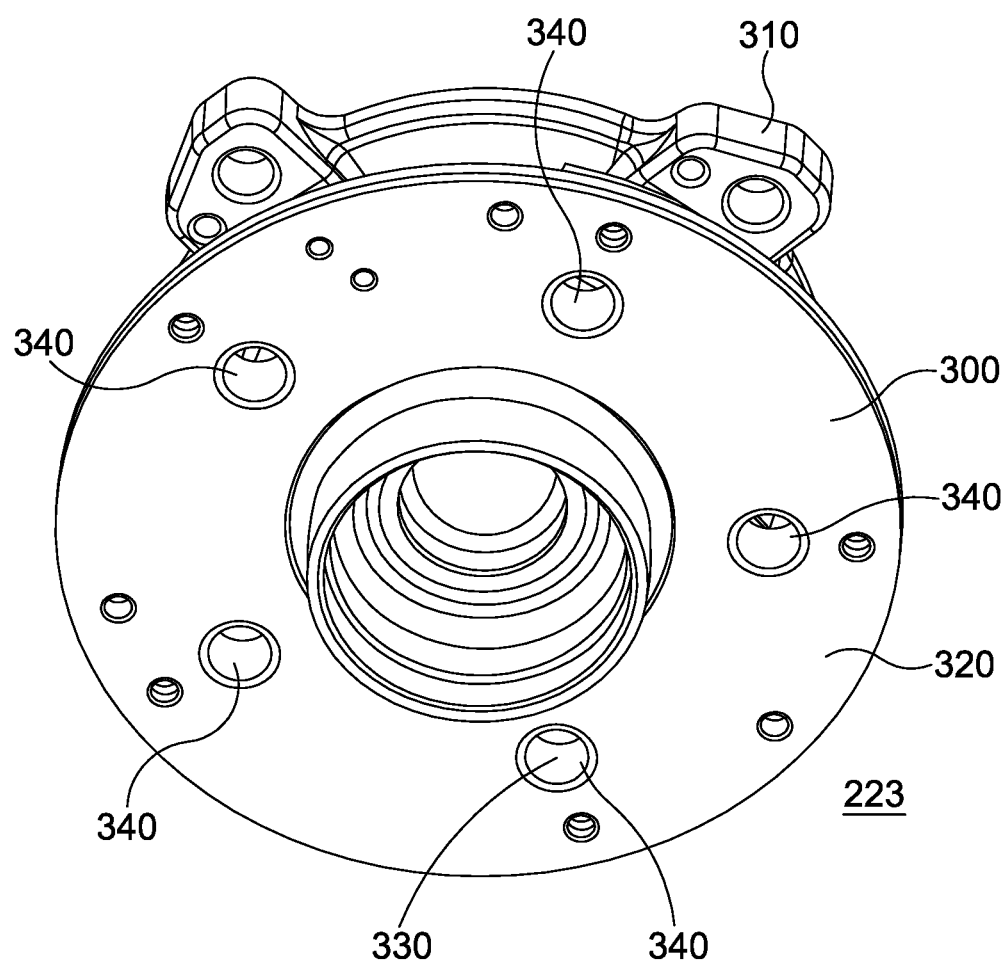
FIG. 4 illustrates a view of the bearing block in FIG. 3 from an alternative angle.

As illustrated in FIGS. 3 and 4, the bearing block 223 comprises two parts, a first coupling element 300 that is arranged to be coupled to the rotor and a second coupling element 310 that is arranged to be coupled to the stator. Although the present embodiment describes the second coupling element 310 arranged to be coupled to the stator, the second coupling element 310 can also be mounted directly to a vehicle to which the in-wheel electric motor and wheel are to be mounted to.

For the purposes of the present embodiment the second coupling element 310 is fixed to a central portion of the stator's heat sink 253, for example by bolting the second coupling element 310 to the heat sink 253. The first coupling element 300 is arranged to be fixed to a central portion on the front radial wall of the rotor front portion 220, as described below.

FIG. 4 shows a view of the same bearing block as FIG. 3 from the opposite side.

Figure 5A:
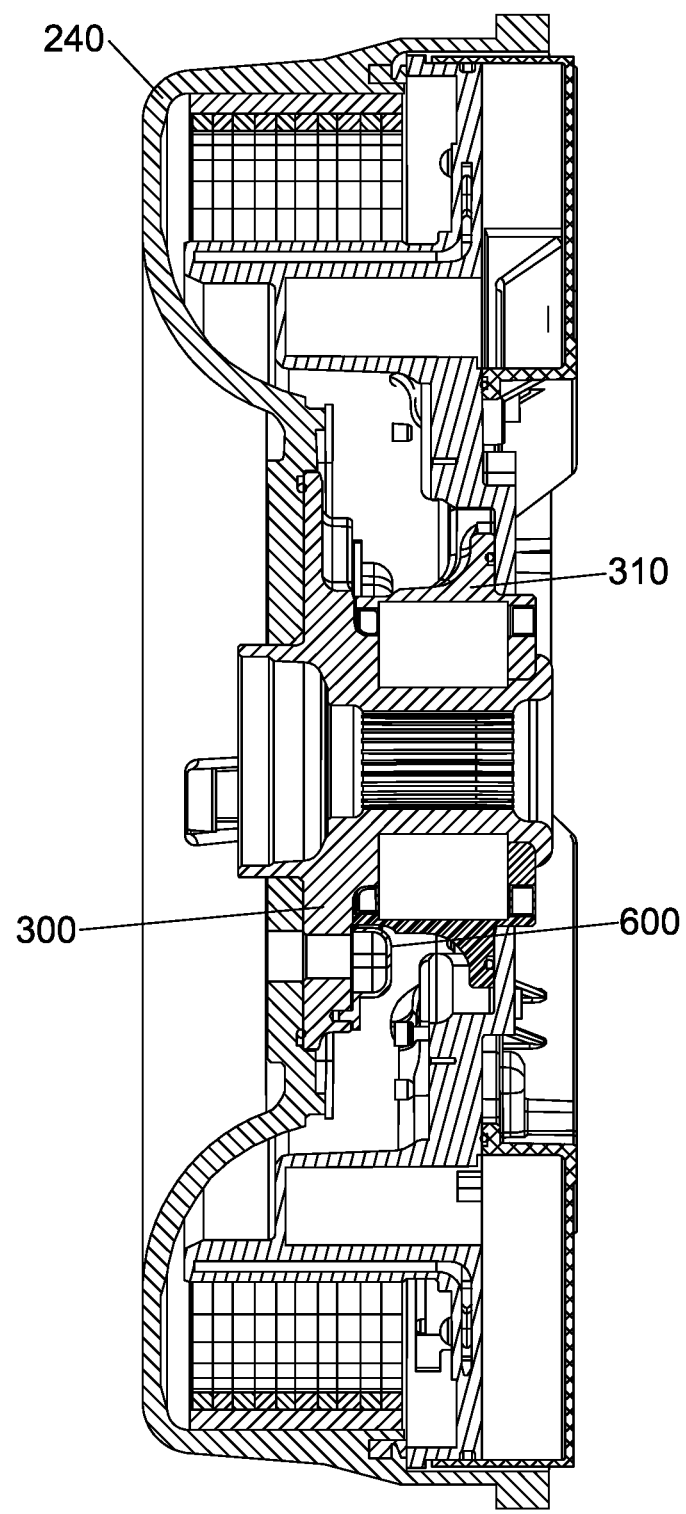
FIGS. 5a and 5b illustrates a cross sectional view of a motor according to an embodiment of the present invention.
Figure 5B:
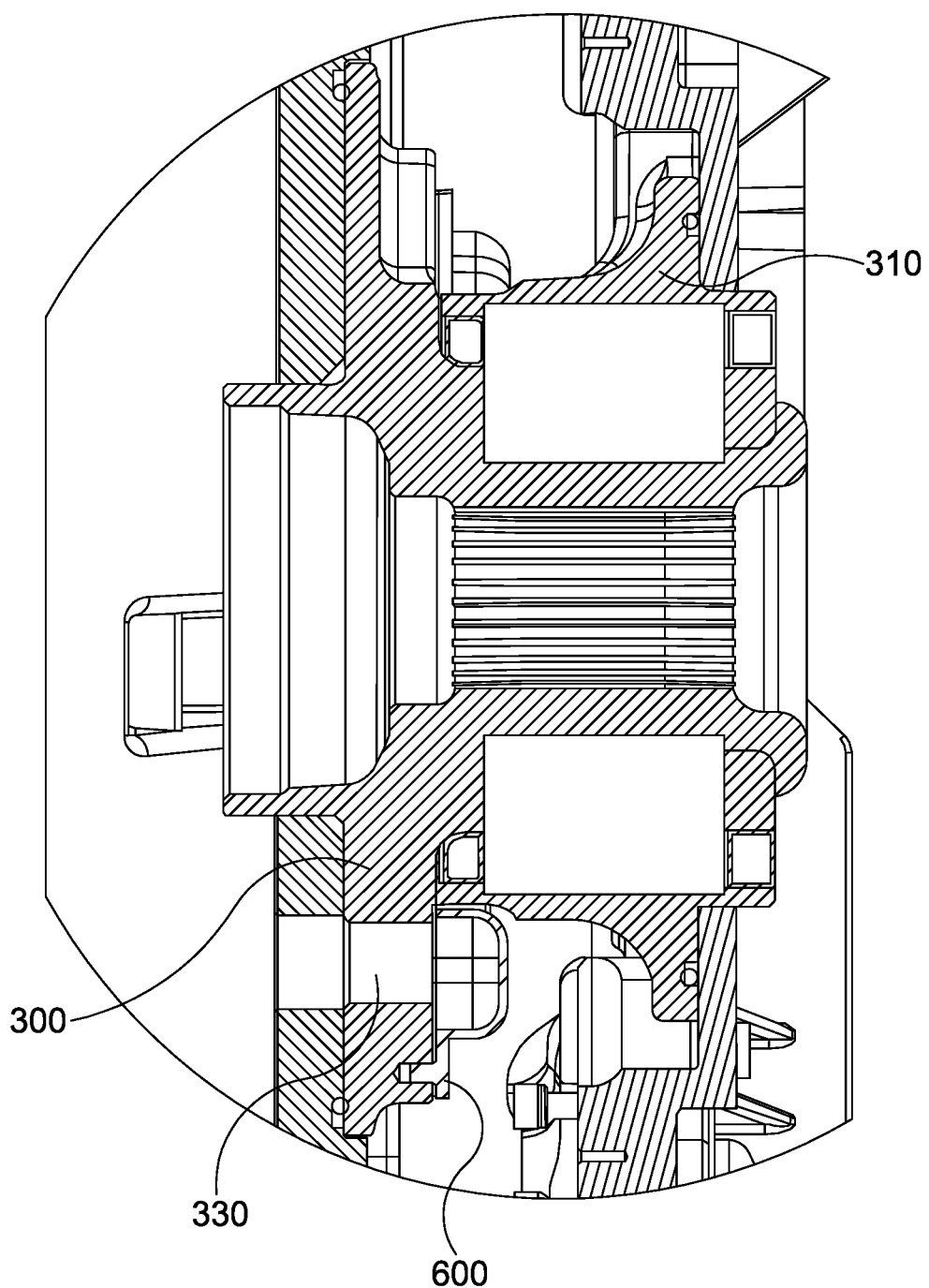

FIGS. 5a and 5b illustrate a cross sectional view of the bearing block 223 mounted to the stator with FIG. 5b showing an exploded view of the bearing. Preferably mounted between the bearing block's first coupling element 300 and second coupling element 310 are two angular contact ball bearings to allow the first coupling element and the second coupling element to rotate relative to each other. The two angular contact ball bearings are arranged as matching front to front angular contact ball bearings.

Angular contact ball bearings can sustain significant axial loads in one direction together with radial loads. As a result of their design, when a radial load is applied an axial force component is produced. Accordingly, in circumstances when radial loads and axial loads in both directions are likely to be sustained, for example when used on a vehicle as a hub motor, it is desirable to use two angular contact ball bearings, for example matched angular contact ball bearings.

The first coupling element 300 and the second coupling element 310 act as the inner and outer rings, respectively, of the two angular contact ball bearings. The balls (not shown) of the angular contact ball bearings are mounted within cages (not shown) placed between the ball bearings inner and outer rings.

Although the bearing block 223 is described as having matched angular contact ball bearings, other types of ball bearings may be used.

As illustrated in FIGS. 3 and 4, the first coupling element 300 includes a mounting flange 320 having a plurality of bolt holes 330 for allowing the electric motor's rotor and a wheel to be mounted to the bearing block 223. The bolt holes 330 are positioned on the mounting flange 320 to correspond with bolt holes formed on the electric motor's rotor and a wheel.

Each of the plurality of bolt holes 330 are arranged to extend through the mounting flange 320 for receiving a cylindrical bolt. The inner surface of each of the bolt holes 330 include a screw thread that is arranged to engage with a corresponding screw thread formed on a bolt to allow a bolt to be screwed into the bolt hole 330. A bolt, arranged to mount a rotor and wheel to the bearing block 223, is arranged to enter the bolt hole 330 via a first aperture 340 formed on the front face off the first coupling element's mounting flange. FIG. 4 shows the first aperture 340 for each of the plurality of bolt holes 330 formed on the front face of the first coupling element's mounting flange 320. Although the present embodiment illustrates the mounting flange 320 as having five bolt holes, the mounting flange 320 may have any number of bolt holes.

As stated above, the bolt holes 330 extend through the mounting flange 320, with the bolt holes 330 having a second aperture 350 formed on the opposite face of the mounting flange 320 to the first aperture 340, as illustrated in FIG. 3.

To prevent the ingress of dirt, water and/or other contaminates into the void between the electric motor's rotor and stator a sealing element is placed over each of the second aperture's 350 formed in the first coupling element's mounting flange 320, thereby preventing dirt, water and/or other contaminates entering through the bolt holes 330 into the electric motor prior to a bolt being placed into each of the respective bolt holes.

Figure 6:
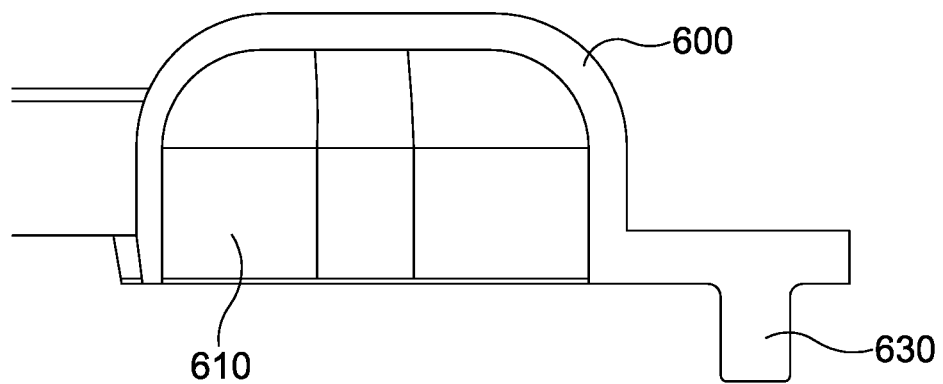
FIG. 6 illustrates a cross sectional view of a sealing element according to an embodiment of the present invention.

Each of the sealing elements mounted over the respective bolt holes second aperture 350 are preferably in the form of a rubber cap having a recess, where a cross sectional view of a preferred embodiment of a sealing element 600 is illustrated in FIG. 6. The use of a recess 610 formed in the sealing element 600 allows a bolt to be extended through the respective bolt holes without the bolts coming into contact with the sealing elements 600, thereby avoiding the sealing elements 600 becoming dislodged when a bolt is used to mount a wheel the electric motor. However, if the respective bolts are arranged to not extend all the way through a bolt hole, the sealing elements 600 can be mounted flush to a second apertures 350 without the sealing elements 600 having a recess. Although, due to its good sealing characteristics, rubber is the preferred material for the sealing elements 600, any suitable material may be used.

Figure 7:
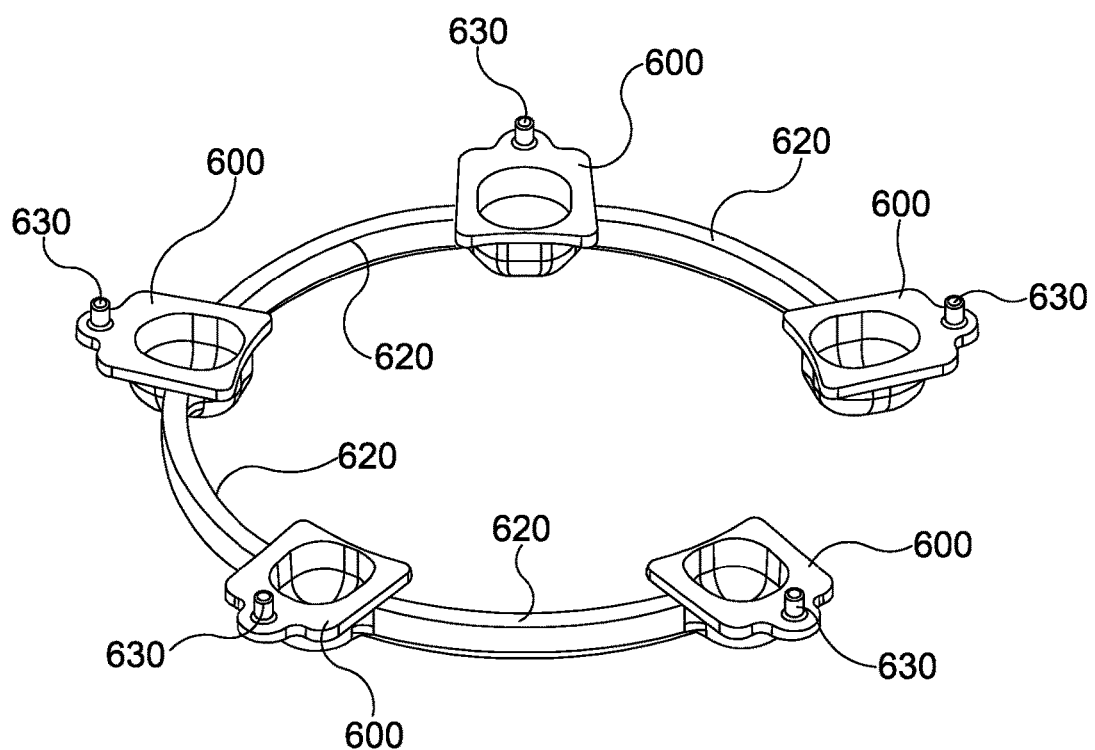
FIG. 7 illustrates a sealing element according to an embodiment of the present invention.
Figure 8:
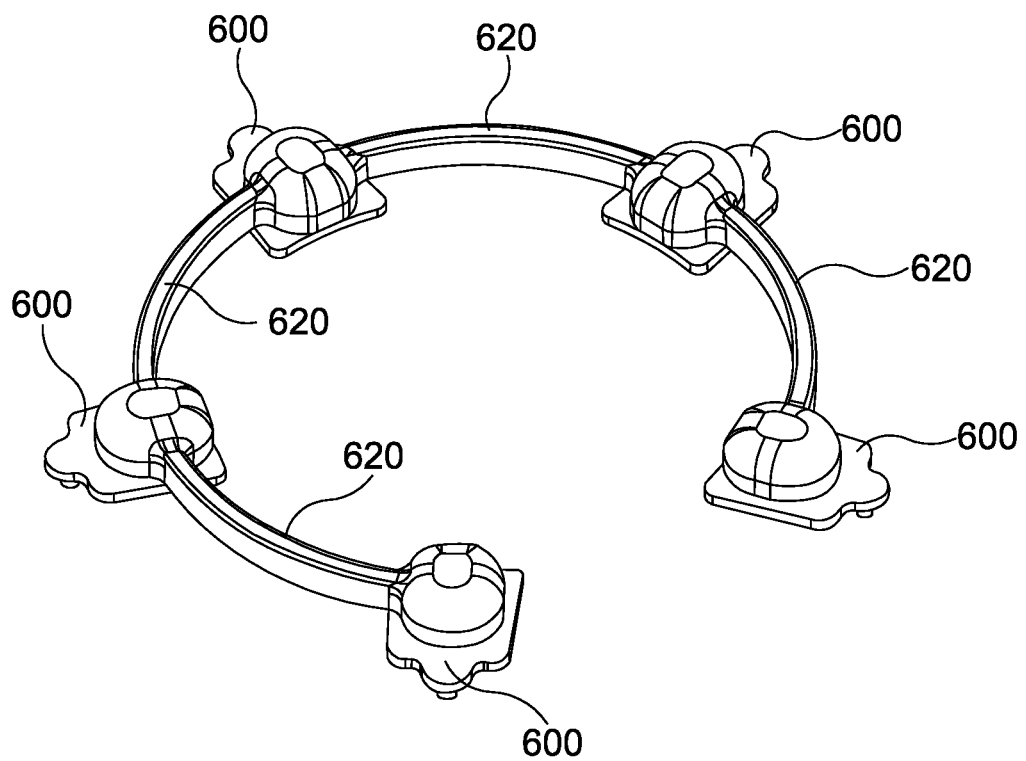
FIG. 8 illustrates a sealing element according to an embodiment of the present invention.

For a mounting flange 320 having a plurality of bolt holes 330, each with an associated sealing element 600, for ease of assembly preferably each of the sealing elements 600 are connected via a coupling element 620, for example a sprue, as illustrated in FIGS. 7 and 8. The coupling elements 620 are preferably flexible in nature to aid the mounting of the respective sealing elements 600 over a respective second aperture 350. Having each of the sealing elements 600 coupled together allows all the sealing elements 600 for an electric motor to be manufactured as part of a single process. Additionally, coupling each of the sealing elements 600 together makes it easier keeping track of each of the sealing elements 600 during assembly of an electric motor.

To facilitate the placement of the sealing elements 600 over a respective second aperture 350, preferably each of the sealing elements 600 includes a keying feature 630 formed on the inner surface of the respective sealing elements 600 that are arranged to match corresponding features on the mounting flange 320.

For improved sealing between the respective sealing elements 600 and mounting flange 320, preferably a sealing compound is placed between the mounting surface of the respective sealing elements 600 and the surface of the mounting flange 320 prior to the mounting of the respective sealing elements 600 to the mounting flange 320.

Once a sealing compound has been applied to the mounting surface of the respective sealing elements 600 and/or the surface of the mounting flange 320, the respective sealing elements 600 are mounted onto the mounting flange 320 with each of the keying features 630 on the sealing elements 600 being placed in a corresponding keying feature on the mounting flange 320.

Figure 9:
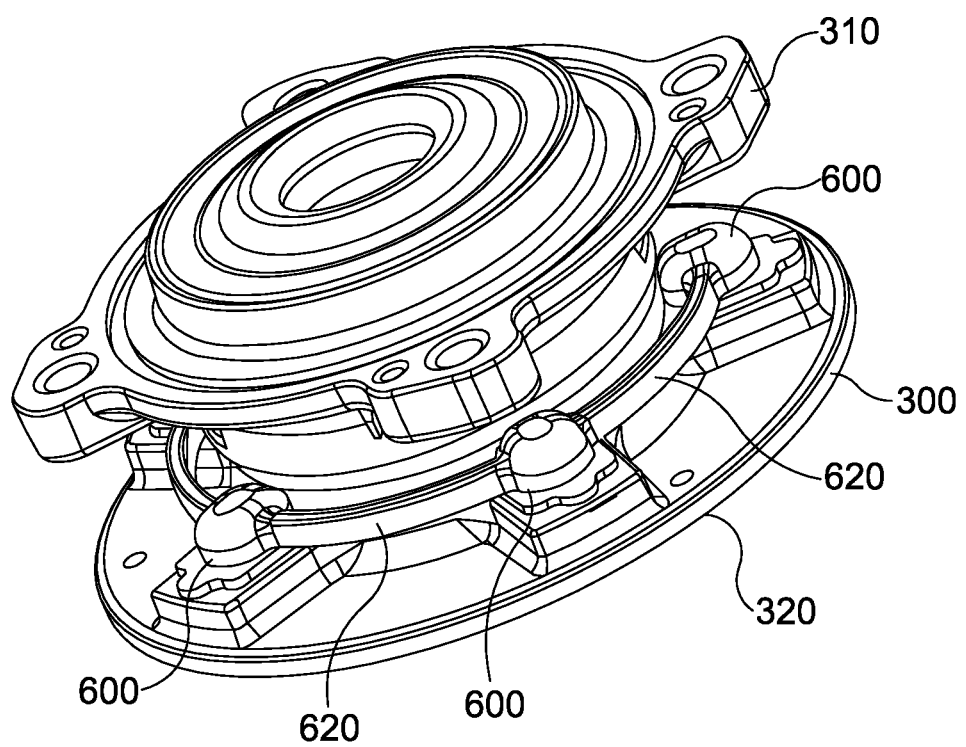
FIG. 9 illustrates a bearing arrangement according to an embodiment of the present invention.
Figure 10:
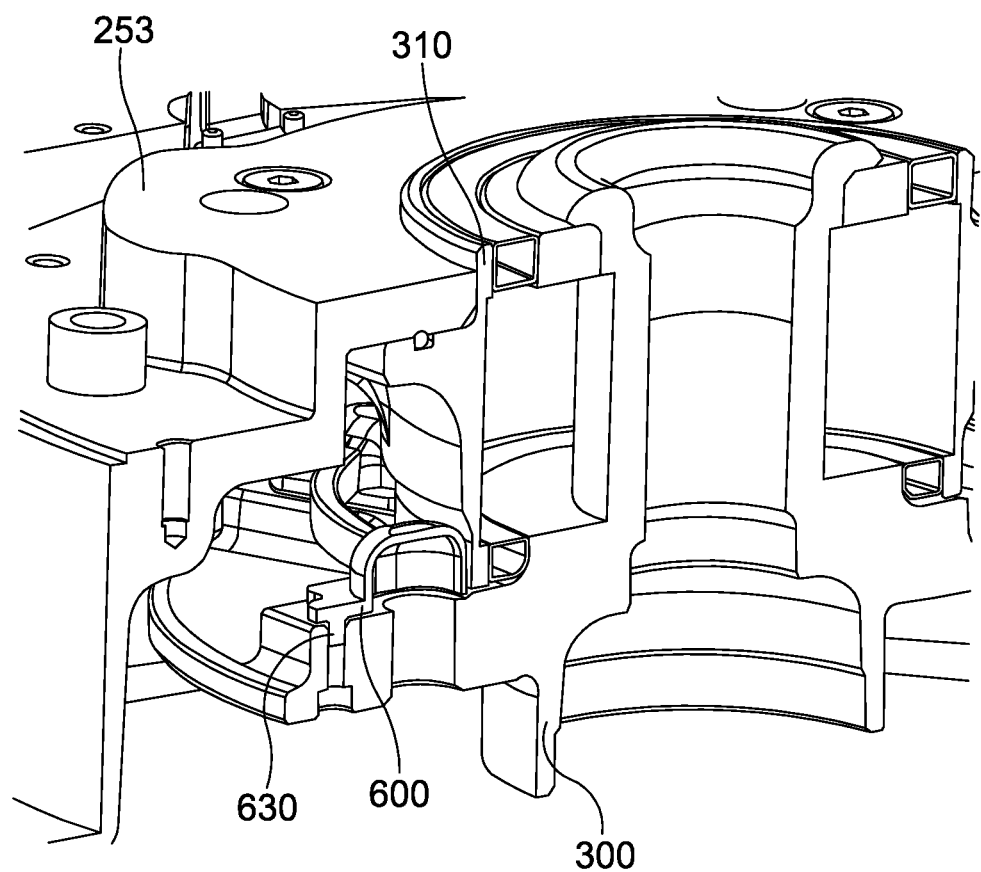
FIG. 10 illustrates a cross sectional view of a bearing arrangement according to an embodiment of the present invention.

FIG. 9 illustrates a cross sectional view of a bearing block 223 to which a sealing element 600 has been placed over a bolt hole 330 formed in the mounting flange 320, with FIG. 10 providing a cross sectional view of a bearing arrangement according to an embodiment of the present invention, where the respective sealing elements 600 prevent the ingress of dirt, water and/or other contaminants through the respective bolt holes prior to the mounting of the rotor and wheel to the stator.

Figure 11A:
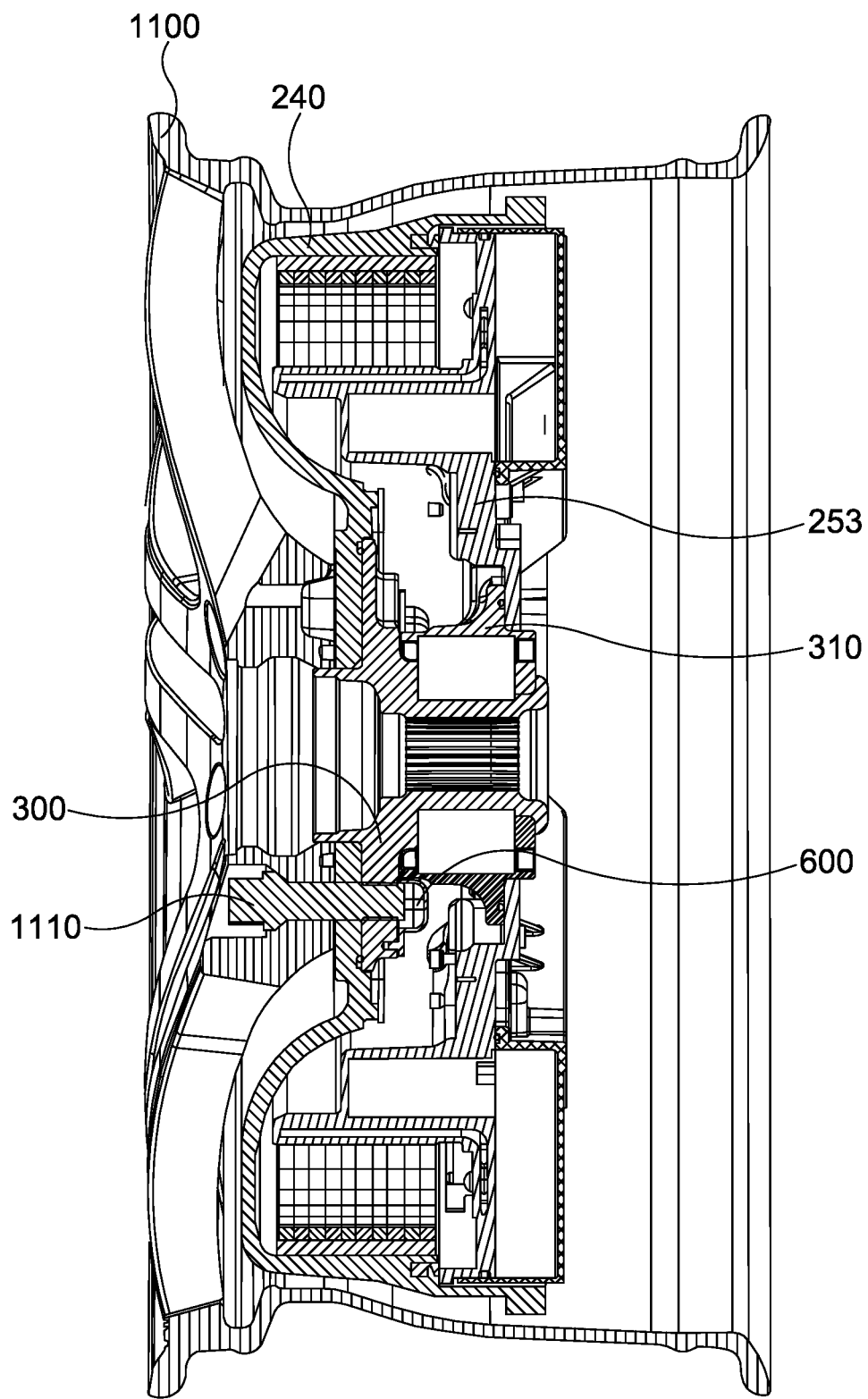
FIGS. 11a and 11b illustrates a bearing arrangement according to an embodiment of the present invention.
Figure 11B:
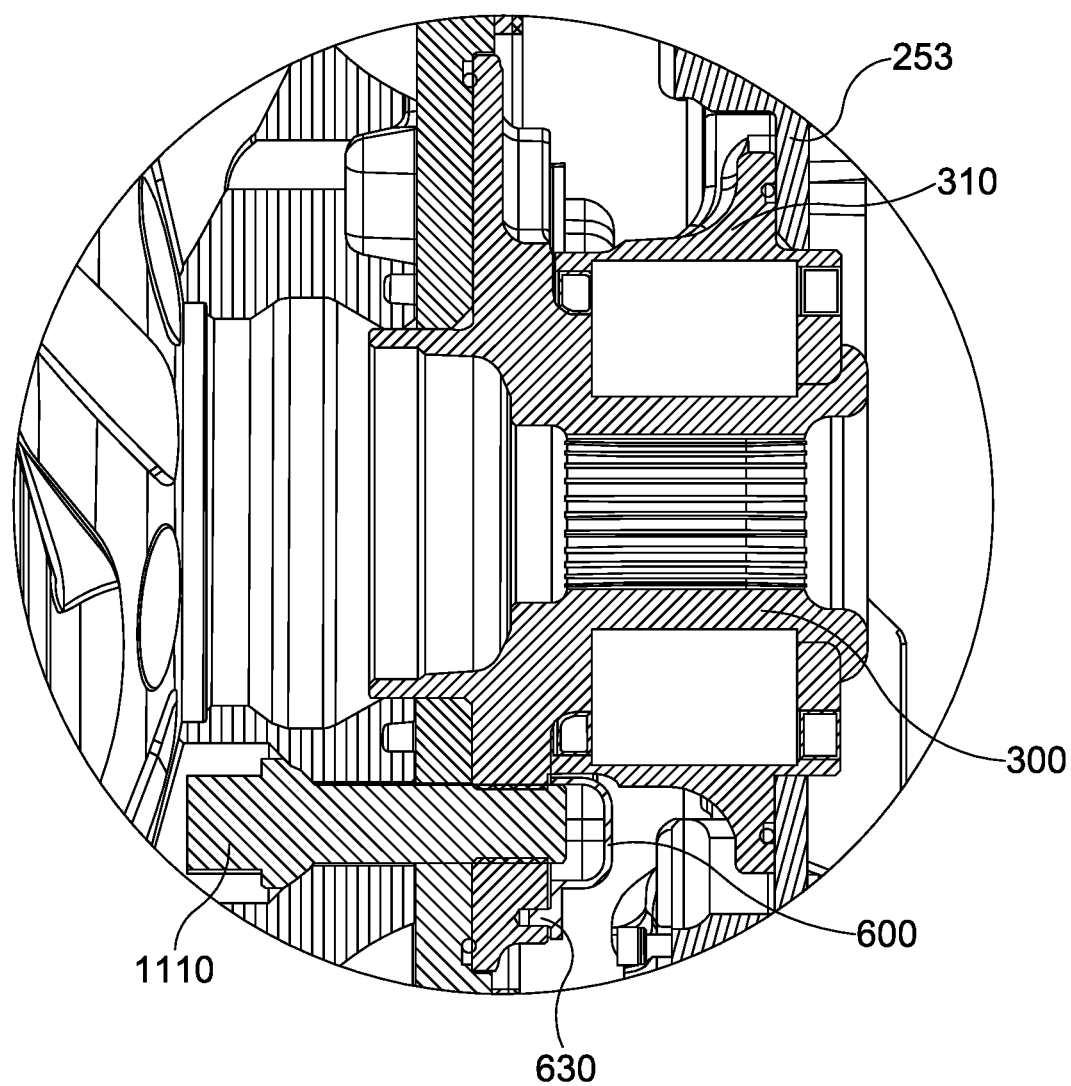

To allow a rotor and wheel 1100 to be mounted to the bearing block 223, and correspondingly to a vehicle/stator, a bolt 1110 is inserted through corresponding bolt holes on the wheel and rotor and are screwed into a corresponding bolt hole formed on the mounting flange, as illustrated in FIG. 11a and FIG. 11b, where FIG. 11a illustrate a cross sectional view of rotor and wheel mounted to the bearing block 223 with FIG. 11b showing an exploded view of the bearing.

The rotor can thus be rotationally fixed to a vehicle with which it is to be used via the bearing block at the central portion on the front radial wall of the front portion 220 of the rotor. This has an advantage in that a wheel rim and tyre can then be fixed to the rotor at the central portion using the normal wheel bolts to fix the wheel rim to the central portion of the rotor and consequently firmly onto the rotatable side of the bearing block. The wheel bolts may be fitted through the central portion of the rotor through into the bearing block itself. An advantage of this arrangement is that the motor assembly 40 may be retrofitted to an existing vehicle by removing the wheel, bearing block and any other components such as the braking arrangement. The existing bearing block can then be fitted inside the assembly and the whole arrangement fitted to the vehicle on the stator side and the normal rim and wheel fitted to the rotor so that the rim and wheel surrounds the whole motor assembly. Accordingly, retrofitting to existing vehicles becomes very simple.

A further advantage is that there are no forces for supporting the vehicle on the outside of the rotor, particularly on the circumferential wall 221 carrying the magnets on the inside circumference. This is because the forces for carrying the vehicle are transmitted directly from the suspension fixed to one side of the bearing block (via the central portion of the stator) to the central portion of the wheel surrounding the rotor fixed to the other side of the bearing block (via the central portion of the rotor wall).

A V shaped seal is provided between the circumferential wall 221 of the rotor and the outer edge of the stator, thereby providing further protection to the ingress of dirt, water and/or other contaminants into the electric motor.

The invention claimed is:

1. A bearing arrangement for mounting a wheel and an electric motor or generator having a stator and a rotor to a vehicle, the bearing arrangement comprising a sealing element and a bearing block, wherein the bearing block includes a first coupling element for coupling to a first radial wall of the rotor and the wheel, and a second coupling element for coupling to the vehicle, with a bearing mounted between the first coupling element and the second coupling element to allow the first coupling element and the second coupling element to rotate relative to each other, wherein the first coupling element includes a mounting flange having a bolt hole arranged to extend through the mounting flange for receiving a bolt at a first aperture of the bolt hole for coupling the rotor and the wheel to the first coupling element, wherein the sealing element is arranged to be mounted over a second aperture of the bolt hole for inhibiting the ingress of material through the bolt hole into the electric motor or generator, wherein the mounting flange includes a plurality of bolt holes arranged to extend through the mounting flange for receiving a respective bolt at a first aperture of each of the bolt holes for coupling the rotor and the wheel to the first coupling element, wherein a plurality of sealing elements are arranged to be mounted over a second aperture of the respective bolt holes for inhibiting the ingress of material through the bolt hole into the electric motor or generator, wherein the plurality of sealing elements are coupled together.

2. A bearing arrangement according to claim 1, wherein the sealing element is arranged to be mounted over a second aperture of the bolt hole for inhibiting the ingress of dirt and/or water through the bolt hole into the electric motor or generator.

3. A bearing arrangement according to claim 1, wherein the sealing element includes a recess.

4. A bearing arrangement according to claim 1, wherein the sealing element is made of rubber.

5. A bearing arrangement according to claim 1, wherein a sealing compound is placed between the sealing element and the mounting flange.

6. A bearing arrangement according to claim 1, wherein the sealing element and mounting flange include a complementary keying feature to facilitate placement of the sealing element over the second aperture.

7. A bearing arrangement according to claim 1, wherein each of the plurality of sealing elements are coupled via a sprue.

* * * * *